US012577329B2

(12) United States Patent
Bazin et al.

(10) Patent No.: US 12,577,329 B2
(45) Date of Patent: Mar. 17, 2026

(54) POLYMER DISPERSION FOR COATING WOOD FOR BLOCKING MIGRATABLE COMPOUNDS

(71) Applicant: Arkema France, Colombes (FR)

(72) Inventors: Clement Bazin, Verneuil en Halatte (FR); Patricia Beurdeley, Colombes Cedex (FR); Frederic Lefevre, Verneuil en Halatte (FR); Fatoumata Camara, Verneuil en Halatte (FR); Chantal Roidot, Colombes Cedex (FR)

(73) Assignee: Arkema France, Puteaux (FR)

( * ) Notice: Subject to any disclaimer, the term of this patent is extended or adjusted under 35 U.S.C. 154(b) by 945 days.

(21) Appl. No.: 17/602,806

(22) PCT Filed: Apr. 23, 2020

(86) PCT No.: PCT/EP2020/061343
§ 371 (c)(1),
(2) Date: Oct. 11, 2021

(87) PCT Pub. No.: WO2020/216850
PCT Pub. Date: Oct. 29, 2020

(65) Prior Publication Data
US 2022/0154033 A1 May 19, 2022

(30) Foreign Application Priority Data

Apr. 25, 2019 (FR) ................................. FR19.04358

(51) Int. Cl.
| | |
|---|---|
| *C08F 8/42* | (2006.01) |
| *B27K 5/02* | (2006.01) |
| *C08F 265/06* | (2006.01) |
| *C09D 7/20* | (2018.01) |
| *C09D 15/00* | (2006.01) |
| *C09D 133/10* | (2006.01) |
| *C09D 143/04* | (2006.01) |

(52) U.S. Cl.
CPC ................. *C08F 8/42* (2013.01); *B27K 5/02* (2013.01); *C08F 265/06* (2013.01); *C09D 7/20* (2018.01); *C09D 15/00* (2013.01); *C09D 133/10* (2013.01); *C09D 143/04* (2013.01)

(58) Field of Classification Search
CPC .... C08F 220/06; C08F 220/18; C08F 220/34; C08F 226/06; C08F 226/08; C08F 226/10; C08F 8/42; C08F 220/14; C08F 230/08
See application file for complete search history.

(56) References Cited

U.S. PATENT DOCUMENTS

| | | | | |
|---|---|---|---|---|
| 5,905,109 A | * | 5/1999 | Shimizu ..................... | C08J 3/07 |
| | | | | 524/506 |
| 7,794,814 B2 | | 9/2010 | Jenkines | |
| 2008/0206579 A1* | | 8/2008 | LaLumere ........... | C09D 143/00 |
| | | | | 428/447 |
| 2008/0311415 A1 | | 12/2008 | Castaing et al. | |
| 2018/0179414 A1 | | 6/2018 | Corordan et al. | |
| 2019/0077971 A1 | | 3/2019 | Boone et al. | |
| 2019/0144702 A1 | | 5/2019 | Bohorquez et al. | |
| 2022/0389264 A1* | | 12/2022 | Dos Santos Rocha ...................... | |
| | | | | C08F 261/04 |

FOREIGN PATENT DOCUMENTS

| | | | |
|---|---|---|---|
| CN | 107828053 A | | 3/2018 |
| DE | 2903022 A1 | | 7/1980 |
| FR | 2889989 A1 | | 3/2007 |
| JP | 11209567 A | * | 8/1999 |
| WO | WO2017081384 A1 | | 5/2007 |
| WO | WO2016203136 A1 | | 12/2016 |
| WO | WO2017191131 A1 | | 11/2017 |
| WO | WO 2021/094445 A1 | * | 5/2020 |

OTHER PUBLICATIONS

Abstract for CN 113045997 (no date).*
Machine translation for JP 4615737 (Jul. 26, 2002).*
Methods to Reduce the Film Forming Temperature of Water-based Coatings authored by Hwang and published at the URL https://www.linkedin.com/pulse/methods-reduce-film-forming-temperature-water-based-coatings-huang/.*
Translation of JP 11-209567 (no date).*

* cited by examiner

*Primary Examiner* — Marc S Zimmer
(74) *Attorney, Agent, or Firm* — Debodhonyaa Sengupta

(57) ABSTRACT

The invention relates to an aqueous polymer dispersion, with said polymer comprising, in its structure, monomer units incorporated from a composition of monomers comprising: a) at least one (meth)acrylic monomer which is a $C_1$-$C_{18}$ (meth)acrylic ester, without any ionic group, b) at least one ethylenically unsaturated monomer carrying at least one carboxylic acid group, c) at least one ethylenically unsaturated monomer carrying a tertiary amine, and with said polymer additionally carrying grafted blocked silane groups in the $-Si(OR_1)_3$ or $-Si-R_2(OR_1)_2$ or $-Si-(R_2)_2(OR_1)$, with $R_1$, $R_2$ being an identical or different $C_1$ to $C_4$ alkyl, and with said grafted blocked silane groups being incorporated by at least one or two routes or their combination. The invention also relates to a coating composition comprising said dispersion of the invention and to its use for aqueous protective coating compositions for wood.

19 Claims, 2 Drawing Sheets

[Fig. 1]
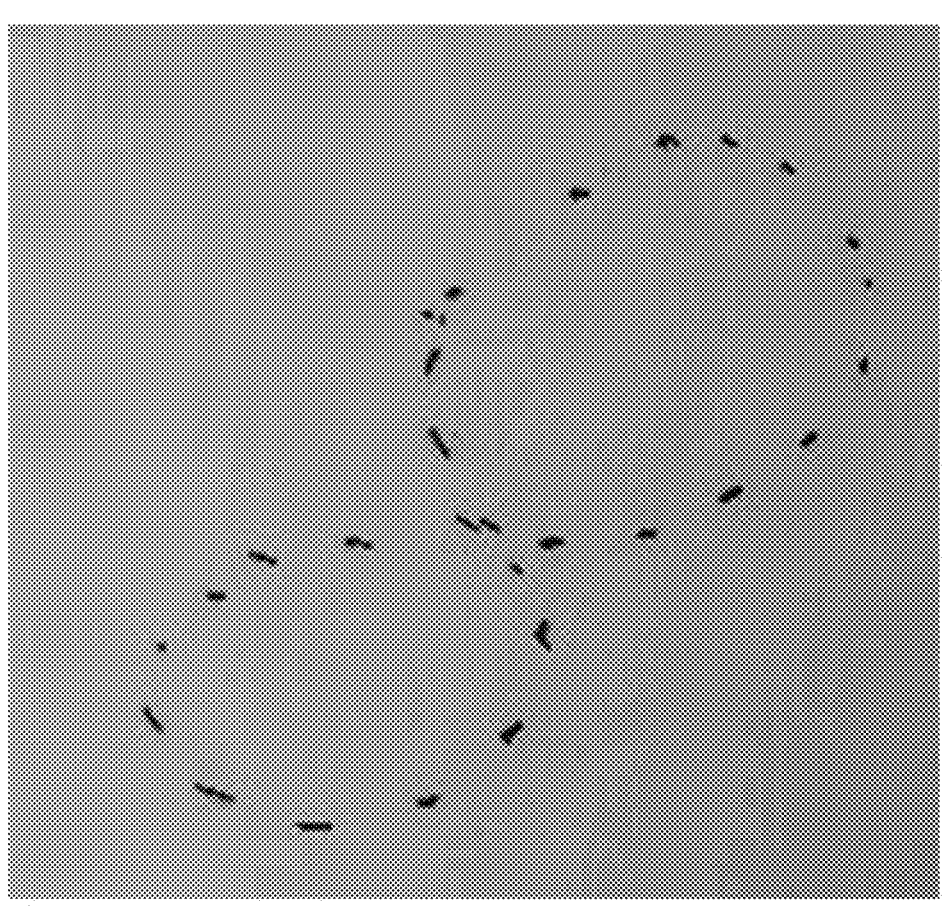
Result for the paint of the dispersion of example 1

[Fig. 2]
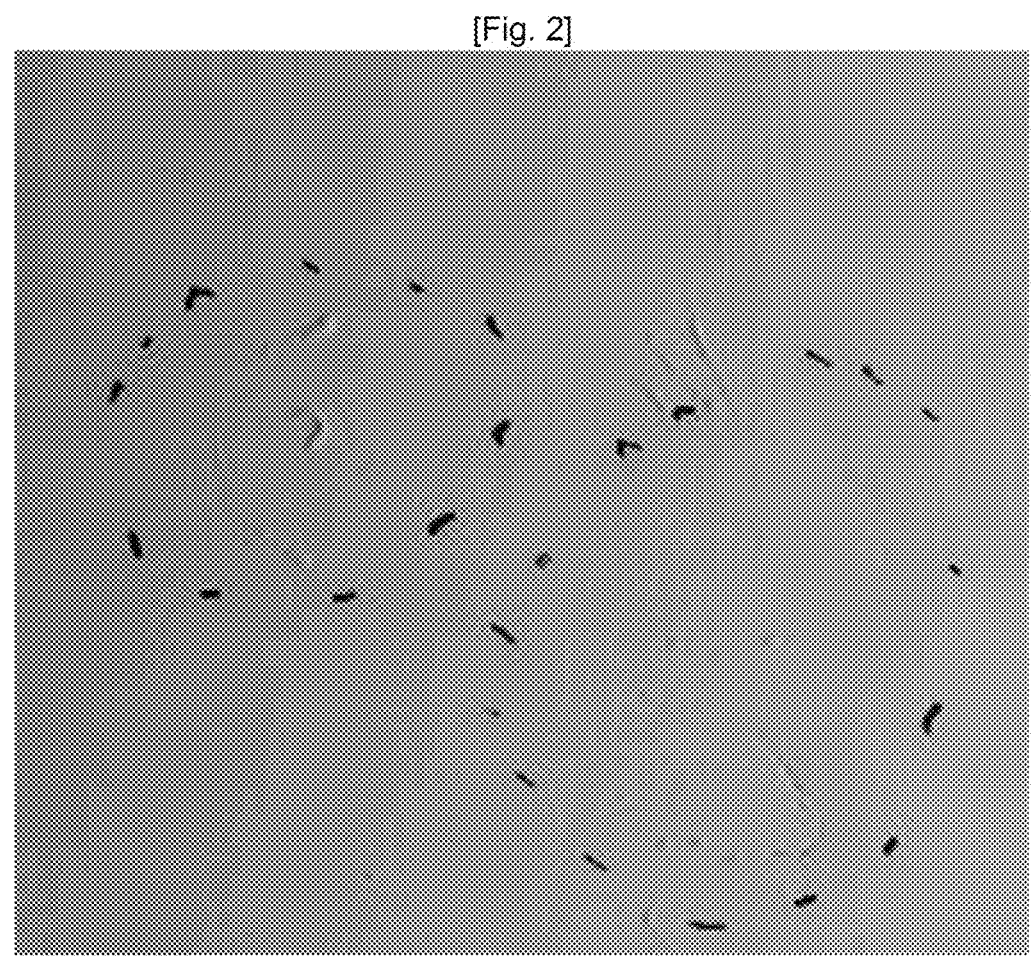
Result for the paint of the dispersion of example 2

POLYMER DISPERSION FOR COATING WOOD FOR BLOCKING MIGRATABLE COMPOUNDS

CROSS-REFERENCE TO RELATED APPLICATIONS

This application is a national stage application under 35 U.S.C. § 371 of PCT/EP2020/061343, filed Apr. 23, 2020 which claims benefit to application FR19.04358, filed Apr. 25, 2019.

The invention relates to an aqueous polymer dispersion which is specific in its composition and its use in a wood coating composition. In particular, said coating exhibits specific applicational performance qualities on wood for preventing (blocking) the migration of tannins and of other compounds present in wood and in particular in wood knots, which can migrate to the surface and form blemishes. In addition, said coating resulting from the dispersion of the present invention exhibits very good resistance to blistering.

BACKGROUND

The present invention relates more particularly to the problem of the blemishes formed at the surface of a coating on wood due to the migration of the tannins of the wood and of other colored compounds of the wood, such as lignin and its derivatives, to the surface of said coating. This problem is even more accentuated for wood surfaces to be coated, the wood of which comprises visible knots at the surface or in the heart. This is because wood knots are a major source of tannins and of other colored compounds, such as lignin and derivatives, which can migrate to the surface of the coating, especially if said knots are already visible at the surface of the wood. Present mainly in softwoods and coniferous woods (cedar, spruce, pine, fir, and the like), the knots can ooze, indeed even flow, for years on end. The resin which exudes creates a yellowish color which even passes through a layer of paint, forming blemishes and blisters. The knots ooze resin until they are completely dry.

In this context, the migration at the surface of the coating of tannins and of other wood compounds which can migrate, such as lignin and derivatives, ultimately causes blisters and colored blemishes over time. This concerns in particular aqueous coatings, such as paint, whether it is a primer and/or topcoat, or a varnish or a stain. Indeed, when an aqueous coating is applied, more or less brown lifts appear on the wood and can spoil the esthetic effect. These blemishes are lifts of tannins and of other colored compounds, such as lignin and its derivatives or also terpene derivatives, which can migrate to the surface of the coating and are extremely resistant: despite several coats of paints, the blemishes can reappear. Tannins are polyphenols and are present in the wood of beech, oak, sweet chestnut, cherry or walnut, for the best known non-coniferous trees, and all exotic woods, including coniferous woods, mainly pine, fir, cedar or spruce.

Said migration can take place after application of the coating and over time by a phenomenon of diffusion-migration of the molecules of tannins and/or of other compounds, such as lignin and its derivatives. These blemishes can affect the performance qualities of the coating on wood both with regard to the esthetic appearance of the coating (poor appearance) and with regard to the aspect of durability of said coating by the formation of blistering bubbles of the coating by the effect of accumulation of tannins and of other compounds mentioned above, with poor adhesion of the coating on the accumulation points where blemishes are formed, among other things.

In general, this type of problem is encountered for coatings on wood having a high concentration of knots. More particularly, the wood concerned is wood of: pine, fir, beech, oak, cedar, spruce, poplar, sweet chestnut, cherry, walnut or exotic woods.

Aqueous-phase coatings, for wood application for blocking tannins and other compounds of wood which can migrate to the surface, are already known, above all as primers based on cationic polymers or based on anionic emulsions.

These solutions known from the state of the art, however, exhibit insufficient performance qualities to be improved and some disadvantages, including:

Coatings based on cationic polymers make possible good blocking but generally they are used as primer (limitation) because they turn yellow over time. On the other hand, in aqueous paint formulation, the presence of specific additives is essential, which restricts the choice, unlike coatings based on anionic emulsion, especially because of the necessary compatibility of said additives with these polymers, which is a serious limitation for industrial manufacture.

As regards coatings based on anionic emulsions, they have limited performance qualities in terms of blocking because they are anionic, because they do not or only slightly retain the migratable compounds, their surfactants not being favorable to this blocking.

No aqueous coating composition known from the state of the art describes compositions based on an aqueous dispersion as defined according to the present invention having at least the performance qualities of the solutions already known from the cited state of the art but without their cited disadvantages.

The solution of the present invention is characterized in particular by an aqueous dispersion combining, in its composition, the presence of a carboxylic acid monomer with a monomer carrying a tertiary amine group, the polymer of the dispersion having grafted blocked silane groups, this combination making possible the targeted performance qualities of blocking tannins and other compounds mentioned and improved resistance to blistering. More particularly, the dispersion of the invention applies to a single-component aqueous coating system insofar as said dispersion is self-crosslinkable without the need for addition of a crosslinking agent.

DESCRIPTION OF THE FIGURES

FIG. 1 depicts the result for the paint of the dispersion of example 1.

FIG. 2 depicts the result for the paint of the dispersion of example 2.

DETAILED DESCRIPTION OF THE INVENTION

The invention relates first to an aqueous polymer dispersion having a specific composition of monomers with the polymer having carboxylic acid, tertiary amine and grafted silane groups.

The second subject matter of the invention relates to a coating composition comprising said dispersion.

Another subject matter of the invention relates to the use of said aqueous dispersion as binder in a coating composition.

Another subject matter of the invention relates to a coating resulting from the use of an aqueous polymer dispersion or of a coating composition according to the invention.

Finally, the invention also covers a coated substrate, in particular made of wood having visible knots at the surface or knots in the heart of the wood.

The first subject matter of the invention thus relates to an aqueous polymer dispersion, in which said polymer comprises, in its structure, monomer units incorporated from a composition of monomers comprising:

a) at least one (meth)acrylic monomer which is a $C_1$-$C_{18}$ alkyl or $C_6$-$C_{18}$ cycloalkyl (meth)acrylic ester, without any ionic group, b) at least one ethylenically unsaturated monomer carrying at least one carboxylic acid group, c) at least one ethylenically unsaturated monomer carrying a tertiary amine, and with said polymer additionally carrying grafted blocked silane groups in the —Si$(OR_1)_3$ or —Si—$R_2(OR_1)_2$ or —Si—$(R_2)_2(OR_1)$, preferably —Si$(OR_1)_3$ or —Si—$R_2(OR_1)_2$, form, with $R_1$, $R_2$ being an identical or different $C_1$ to $C_4$ alkyl, and with said grafted blocked silane groups being incorporated by at least one of the following two routes or their combination:

d) presence with the monomers a), b) and c) of at least one ethylenically unsaturated comonomer d) carrying, in addition to said ethylenic unsaturation, at least one blocked silane group as defined above, and/or e) presence with the monomers a), b) and c) of, or post-treatment of the aqueous dispersion with, at least one silane compound e) carrying at least one blocked silane group as defined above and at least one functional group selected from: epoxy, amino, thio, hydroxyl or isocyanate, preferably epoxy, the latter group being capable of reacting, at least in part, with the carboxylic groups of said monomer b), and preferably by route e).

The solids content of the dispersion according to the invention can vary from 35% to 60% and more particularly from 40% to 55% by weight, according to the ISO 3251: 2019 method.

The volume-average size of the particles of said polymer dispersion can vary from 50 to 500 nm, preferably from 50 to 400 nm, according to the ISO 22412:2017 method. The average size of the particles can in particular be measured by light diffraction.

The dispersion according to the invention can be prepared by a standard emulsion polymerization process containing the monomers a), b) and c) and, depending on the case, d) in the presence of an emulsion polymerization initiator which can be selected from: ammonium persulfate, sodium persulfate, potassium persulfate, tert-butyl hydroperoxide, hydrogen peroxide or the combination of an oxidizing agent with a reducing agent such that the oxidizing agents can be selected from tert-butyl hydroperoxide and ammonium persulfate (the compounds mentioned above) and the reducing agents can be selected from sodium formaldehyde sulfoxylate, sodium hydrosulfite, sodium metabisulfite, ascorbic acid, sodium thiosulfate, the sodium salt of 2-hydroxy-2-sulfinatoacetic acid (Bruggolite® FF6) preferably: ammonium persulfate, sodium persulfate, potassium persulfate or the red/ox system tert-butyl hydroperoxide/sodium salt of 2-hydroxy-2-sulfinatoacetic acid or tert-butyl hydroperoxide/sodium formaldehyde sulfoxylate.

The emulsion of the monomers a), b) and c) and optionally d) and/or e) is prepared with a system of surfactants comprising at least one ionic surfactant and at least one nonionic surfactant. Mention may be made, among the suitable ionic surfactants, of: sulfates, sulfonates, phosphates, phosphonates or phosphinates of $C_8$-$C_{14}$ fatty alcohols which are optionally alkoxylated with ethoxy and/or propoxy, ethoxy being preferred with an ethoxy number of 1 to 30, preferably of 2 to 10.

Mention may be made, as suitable nonionic surfactants, of: $C_{12}$-$C_{16}$ fatty alcohols alkoxylated with ethoxy and/or propoxy, ethoxy being preferred with an ethoxy number of 3 to 50, preferably of 5 to 40.

The emulsion polymerization can take place at a temperature ranging from 55° C. to 95° C., preferably from 65° C. to 85° C.

Said compound e) can be an oligomeric compound, preferably having a molecular weight of at least 300 and of less than 1500 and preferably from 300 to 1000 and/or a nonoligomeric compound with a molecular weight <300. It can be present with the monomers a), b), c) and d) or it is post-added to the polymer dispersion at the end of the polymerization and in a separate stage of the polymerization.

Within the meaning of the present invention, the term "ethylenically unsaturated" means a means a compound comprising a polymerizable carbon-carbon double bond. A polymerizable carbon-carbon double bond is a carbon-carbon double bond that can react with another carbon-carbon double bond in a polymerization reaction. A polymerizable carbon-carbon double bond is generally included in an acrylate (—O—C(=O)—CH=CH$_2$, also called acryloyloxy), methacrylate (—O—C(=O)—C(CH$_3$)=CH$_2$, also called methacryloyloxy), acrylamide (—NH—C(=O)—CH=CH$_2$, also called acrylamido), methacrylamide (—NH—C(=O)—C(CH$_3$)=CH$_2$, also called methacrylamido), alkenyl (—CH=CH—), vinyl (—CH=CH$_2$), vinyl ether (—O—CH=CH$_2$) or allyl (—CH$_2$—CH=CH$_2$) group. The carbon-carbon double bonds of a phenyl ring are not regarded as polymerizable carbon-carbon double bonds.

Within the meaning of the present invention, the term "(meth)acrylic monomer" means a monomer having at least one group chosen from acrylate, methacrylate, acrylamide, methacrylamide and their mixtures.

Within the meaning of the present invention, the term "vinyl monomer" means a monomer having at least one group chosen from alkenyl, vinyl, vinyl ether and their mixtures.

Within the meaning of the present invention, the term "allyl monomer" means a monomer having at least one allyl group.

The monomer b) is an ethylenically unsaturated monomer carrying at least one carboxylic acid group.

The term "carboxylic acid group" means a —COOH group and its derivatives. The carboxylic acid derivatives are groups which can generate one or two —COOH groups by hydrolysis, in particular the anhydrides (—C(=O)—O—C(=O)—). The anhydrides can be linear or cyclic.

Mention may be made, as suitable monomer b), of a monomer selected from (meth)acrylic acid, itaconic acid, fumaric acid, maleic acid, crotonic acid, tetrahydrophthalic acid, itaconic anhydride, fumaric anhydride, maleic anhydride, crotonic anhydride, tetrahydrophthalic anhydride, hemi-esters of dicarboxylic acid with a hydroxyalkyl (meth)acrylate in which said linear or branched alkyl comprises from 2 to 4 carbon atoms and can optionally be alkoxylated, in particular by an alkoxy group comprising from 2 to 4 carbon atoms, hemi-esters of dicarboxylic acid with a monohydroxylated polyether-mono(meth)acrylate or polyestermono(meth)acrylate oligomer, preferably the polyether diol or polyester diol oligomers serving as the basis for these (meth)acrylated oligomers carrying a carboxylic acid functional group having a number-average molecular weight Mn (calculated by measuring the end functional groups) of less than 1000 and of preferably less than 500.

Preferably, the monomer b) is (meth)acrylic acid or itaconic acid.

According to a specific embodiment, the composition of monomers comprises from 0.5% to 10%, preferably from 1% to 5%, of monomer b).

The monomer c) is an ethylenically unsaturated monomer carrying a tertiary amine. The monomer c) can in particular be a (meth)acrylic monomer carrying a tertiary amine or a vinyl monomer carrying a tertiary amine, preferably a (meth)acrylic monomer carrying a tertiary amine. Said monomer c) can be selected from: 2-dimethylaminoethyl (meth)acrylate, 2-diethylaminoethyl (meth)acrylate, N-(3-(N,N-dimethylamino)propyl)(meth)acrylamide, 3-dimethyl-aminopropyl (meth)acrylate, 3-diethylaminopropyl (meth)acrylate, 4-(N,N-dimethylamino)styrene, 4-(N,N-diethylamino)styrene, 4-vinylpyridine, 2-dimethylaminoethyl vinyl ether, 2-diethylaminoethyl vinyl ether, 3-dimethylaminopropyl vinyl ether, 3-diethyl-aminopropyl vinyl ether, 4-dimethylaminobutyl vinyl ether and 6-dimethylaminohexyl vinyl ether, preferably 2-dimeth-ylaminoethyl (meth)acrylate and 2-diethylaminoethyl (meth)acrylate.

According to a specific embodiment, the composition of monomers comprises from 0.5% to 20%, preferably from 1% to 15%, of monomer c).

The monomer a) is a (meth)acrylic monomer without any ionic group, in particular without a carboxylic acid group.

The monomer a) is a $C_1$-$C_{18}$ alkyl (meth)acrylate or a $C_6$-$C_{18}$ cycloalkyl (meth)acrylate. The monomer a) can in particular correspond to the formula:

$$R^1—O—C(=O)—CR^2=CH_2$$

with $R^1$ is a $C_1$-$C_{18}$ alkyl or a $C_6$-$C_{18}$ cycloalkyl; and $R^2$ is H or methyl.

The term "alkyl" means a saturated acyclic monovalent hydrocarbon radical of formula —$C_nH_{2n+1}$. An alkyl can be linear or branched. A "$C_1$-$C_{18}$ alkyl" means an alkyl comprising from 1 to 18 carbon atoms. Examples of alkyl groups are methyl, ethyl, propyl, isopropyl, n-butyl, isobutyl, tert-butyl, pentyl, hexyl, 2-ethylhexyl, n-octyl, isooctyl, nonyl, decyl, dodecyl or stearyl.

The term "cycloalkyl" means a monovalent hydrocarbon radical having one or more nonaromatic rings. A cycloalkyl can be saturated or unsaturated. A "$C_6$-$C_{18}$ cycloalkyl" means a cycloalkyl comprising from 6 to 18 carbon atoms. Examples of cycloalkyl groups are cyclohexyl, dimethylcy-clohexyl, trimethylcyclohexyl, tert-butylcyclohexyl, isobor-nyl, norbornyl or dicyclopentadienyl.

Mention may be made, as monomer a) suitable for said dispersion, of a $C_1$-$C_{18}$ alkyl (meth)acrylate chosen from methyl (meth)acrylate, ethyl (meth)acrylate, propyl (meth) acrylate, butyl, in particular n-butyl, (meth)acrylate, 2-eth-ylhexyl (meth)acrylate, isooctyl or n-octyl (meth)acrylate, nonyl (meth)acrylate, decyl (meth)acrylate, lauryl (meth) acrylate and stearyl (meth)acrylate, or a $C_6$-$C_{18}$ cycloalkyl (meth)acrylate chosen from: cyclo-hexyl (meth)acrylate with cyclohexyl substituted or unsubstituted by a $C_1$-$C_4$ or $C_1$-$C_2$ alkyl, isobornyl (meth)acrylate, norbornyl (meth)acrylate or dicyclopentadienyl (meth)acrylate, preferably cyclohexyl (meth)acrylate, isobornyl (meth)acrylate and norbornyl (meth)acrylate.

According to a specific embodiment, the composition of monomers comprises from 50% to 98%, preferably from 70% to 90%, of monomer a).

The aqueous dispersion according to the invention can comprise, by weight, with respect to the total weight of the monomers a)+b)+c):

from 50% to 98%, preferably from 70% to 90%, of said monomer a), from 0.5% to 10%, preferably from 1% to 5%, of said monomer b), from 0.5% to 20%, preferably from 1% to 15%, of said monomer c), with the sum of the % values a)+b)+c) being equal to 100.

The aqueous dispersion according to the invention can be obtained from a composition of monomers comprising:

from 50% to 98%, preferably from 70% to 90%, of monomer a), from 0.5% to 10%, preferably from 1% to 5%, of mono-mer b), and from 0.5% to 20%, preferably from 1% to 15%, of monomer c), the % values being % values by weight, with respect to the weight of the composition of mono-mers.

According to a specific embodiment, the composition of monomers comprises less than 25%, less than 20%, less than 15%, less than 10%, less than 5% or less than 1% by weight of vinylaromatic monomers, in particular of vinyltoluene and/or of styrene, with respect to the weight of the compo-sition of monomers.

According to a specific option of the invention, in said aqueous dispersion, said monomer a) is a mixture of a monomer a1), at least one $C_1$-$C_2$ alkyl (meth)acrylate, and of a monomer a2), at least one $C_4$-$C_{18}$, preferably $C_4$-$C_{12}$, alkyl (meth)acrylate, more particularly with a ratio by weight of a1/(a1+a2) ranging from 25% to 75%, preferably from 35% to 65%.

More particularly, said mixture a) comprises, as monomer a1), methyl or ethyl (meth)acrylate and, as monomer a2), butyl or 2-ethylhexyl or lauryl (meth)acrylate.

The polymer of the aqueous dispersion according to the invention preferably has a Tg, determined by DSC, with a heating rate of 10° C./min, in two passes, ranging from −20 to 60° C. and preferably from −10 to 50° C.

Said aqueous dispersion of the invention has in particular a minimum film formation temperature MFFT according to the standard ISO 2115:1996 method which ranges from 0 to 60° C. and preferably from 0 to 40° C.

The acid number of the polymer of said dispersion can vary from 5 to 100, preferably from 5 to 50, mg KOH/g, calculated by the material balance (% acid monomer with respect to the total weight of monomers).

The tertiary amine number of said polymer can vary from 5 to 100, preferably from 10 to 70, mg KOH/g by calculation from the material balance as for the acid number.

More particularly, said grafted silane groups of the poly-mer of said dispersion are incorporated in said polymer by the presence, with said monomers a), b) and c), of at least one silane monomer d) selected from: (meth)acrylic, vinyl or allyl monomers carrying at least one blocked silane group as defined above, preferably from (meth)acrylic or vinyl mono-mers.

Mention may be made, as (meth)acrylic monomers car-rying at least one blocked silane group as defined above, of: ((meth)acryloyloxymethyl)trimethoxysilane, (3-(meth)acryloyloxypropyl)triisopropoxysilane, (3-(meth)acryloyloxy-propyl)trimethoxysilane, (3-(meth)acryloyloxypropyl)tri-ethoxysilane, (3-(meth)acryloyloxypropyl)tributoxysilane (with butoxy=n-butoxy or isobutoxy), (3-(meth)acryloy-loxypropyl)methyldimethoxysilane, (3-(meth)acryloy-propyl)dimethylm ethoxysilane, (3-(meth)acryloyloxypro-pyl)methyldiethoxysilane or (3-(meth)acrylamidopropyl) trimethoxysilane.

Within the meaning of the present invention, the term "(meth)acryloyloxy" means acryloyloxy or methacryloy-loxy. The term "(meth)acrylamido" means acrylamido or methacrylamido.

Mention may be made, as vinyl monomers carrying at least one blocked silane group as defined above, of: vinyl-triisopropoxysilane, vinyltrimethoxysilane or vinyltriethox-ysilane.

Mention may be made, as allyl monomers carrying at least one blocked silane group as defined above, of: allylt-rimethoxysilane or allyltriethoxysilane.

Said grafted silane groups can be incorporated in said polymer by the presence, with said monomers a), b) and c), of at least one silane compound e), in the presence of said monomers a), b) and c) or in post-treatment of said disper-sion with said silane compound e) selected from: epoxysi-lanes, aminosilanes, thiosilanes, hydroxysilanes and isocya-natosilanes, the silane groups being blocked and as defined above, preferably from epoxysilanes.

An epoxysilane is a compound having at least one epoxy (also called glycidyl) group and at least one blocked silane group. Mention may be made, as examples of epoxysilane compounds e) suitable for the dispersion according to the invention, of: (2-(3,4-epoxycyclohexyl)ethyl)trimethoxysi-lane, (2-(3,4-epoxycyclohexyl)ethyl)triethoxysilane, (3-gly-cidoxypropyl)trimethoxysilane, (3-glycidoxypropyl)tri-ethoxysilane, (3-glycidoxypropyl)methyldiethoxysilane, (3-glycidoxypropyl)methyldimethoxysilane, (3-glycidoxy-propyl)ethyldimethoxysilane or (3-glycidoxypropyl)ethyl-diethoxysilane, preferably (3-glycidoxypropyl)trimethox-ysilane, (3-glycidoxypropyl)triethoxysilane, (3-glycidoxypropyl)methyldiethoxysilane, (3-glycidoxypro-pyl)methyldimethoxysilane, (3-glycidoxypropyl)ethyldime-thoxysilane or (3-glycidoxypropyl)ethyldiethoxysilane.

The epoxysilane compound may or may not be oligomeric with an epoxy functionality ranging from 1 to 10 and a blocked silane functionality as defined above ranging from 1 to 10.

An aminosilane is a compound having at least one pri-mary or secondary amine group and at least one blocked silane group. Mention may be made, as examples of ami-nosilanes, of (3-aminopropyl)trimethoxysilane, (3-amino-propyl)triethoxysilane, (3-(2-aminoethylamino)propyl) trimethoxysilane or (3-(2-aminoethylamino)propyl) triethoxysilane.

A thiosilane is a compound having at least one thiol (also called mercapto) group and at least one blocked silane group. Mention may be made, as examples of thiosilane, of (3-mercaptopropyl)trimethoxysilane or (3-mercaptopropyl) triethoxysilane.

An isocyanatosilane is a compound having at least one isocyanate group and at least one blocked silane group.

According to another specific option of the invention, said grafted silane groups are incorporated in said polymer by combining said routes d) and e).

Said grafted silane groups can be present with a content by weight of said monomer d) and/or of said compound e) ranging from 0.01% to 5% and preferably from 0.05% to 2.5%, or 0.1% to 2%, or 0.5% to 1.5%, with respect to the dry weight of said polymer. In the case of the presence of the monomer d) and of the compound e), said content by weight relates to the sum of the monomer d) and of the compound e).

The composition of monomers used in order to obtain the polymer of the dispersion according to the invention can optionally comprise, in addition to the components men-tioned, at least one other component f) which is an additional monomer and can be a vinylaromatic or vinyl ester of vinyl alcohol with acetic or versatic acid or a $C_1$-$C_6$ diester of maleic or fumaric acid monomer, preferably a vinylaromatic monomer. Mention may be made, as vinylaromatic mono-mer, of styrene and (o-, m- and p-)vinyltoluenes. Such a monomer f), if present, can represent from 5% to 50%, preferably from 10% to 30%, by weight of the component a) as defined above.

The second subject matter of the invention relates to a coating composition which comprises at least one polymer dispersion as defined above according to the invention.

More particularly, in said coating composition, said dis-persion represents from 10% to 60% and preferably from 15% to 50% by dry weight of solids, with respect to the total weight of the solids of said coating composition.

More preferentially, said coating composition of the invention is an aqueous paint, varnish or stain composition for the protection of wood, preferably for wood comprising knots in the heart and at the surface which are visible. More particularly, it is a primer and/or topcoat which is resistant to blistering and to the migration of the tannins and of other compounds which can migrate to the surface, resulting from the wood knots.

Said other compounds which can migrate can be lignin and its derivatives present in the wood and in particular in said wood knots.

More particularly still, said coating composition is a crosslinkable coating composition with or without the addi-tion of a crosslinking agent and in particular a self-cross-linkable coating composition. In the case without the addi-tion of a crosslinking agent, the coating composition of the invention has the advantage of being a one-component crosslinkable aqueous system, in comparison with known two-component aqueous systems.

This is because the coating composition of the invention can crosslink alone without the addition of a crosslinking agent by a condensation reaction between two blocked silane groups (after hydrolysis) carried by different polymer chains during film formation (coalescence of the polymer particles) and drying of the coating film formed.

In the case of a paint, the coating composition can additionally comprise at least one organic or inorganic pigment. The pigment volume concentration (PVC) of the aqueous paint composition according to the invention can vary from 15% to 70%, preferably from 20% to 45%.

The coating composition can have a solids content which can vary from 5% to 70%, preferably from 10% to 65%.

Other additives can be present in the aqueous coating composition, such as: biocides, fungicides, thickeners, wet-ting agents, antifoaming agents, coalescent agents, rheology agents or inorganic fillers.

Another subject matter of the invention relates to the use of the aqueous dispersion of the invention as a binder in aqueous coating compositions and in particular in aqueous paint compositions, more particularly in primers and/or topcoats, varnish compositions or stain compositions, pref-erably for the protection of wood. Said use relates more particularly to the protection of wood having visible knots at the surface or knots in the heart of the wood. In said use, said coatings are preferably paints, in particular primers and/or topcoats, in order to improve the resistance to blistering and to the migration of the tannins and of the compounds which can migrate to the surface, resulting from the knots of the wood, in comparison with a paint using a polymer dispersion without combining the monomer c) and the blocked silane groups incorporated in said polymer by said route d) and/or by said route e) as are defined according to the invention above.

Another subject matter of the invention relates to the coating which results from the use of an aqueous polymer dispersion or of a coating composition as defined above, according to the invention. Preferably, it is a paint coating, in particular a primer and/or topcoat coating, or a varnish or stain coating.

The final subject matter of the invention relates to a substrate coated with at least one coating layer as defined above according to the invention. More particularly, said substrate is made of wood and in particular comprises, at the surface, visible knots or knots in the heart of the wood. Said substrate wood is preferably chosen from woods, in particular from: pine, fir, beech, oak, cedar, spruce, poplar, sweet chestnut, cherry, walnut and exotic woods. Mention may be made, as examples of suitable exotic woods, of: teak, merbau, mahogany or movingui.

The following examples are presented below by way of illustration of the invention and of its performance qualities and do not in any way limit its coverage, which is defined by the claims.

EXAMPLES

1) Starting Materials Used for Synthesis and Application

TABLE 1

| Constituents | Functions | Chemical nature | Suppliers |
|---|---|---|---|
| Rhodafac ® RS 610 A 25E | Surfactant | 25% Polyoxyethylene tridecyl phosphate ester in water | Solvay |
| Disponil ® A3065 | Surfactant | 30 EO Ethoxylated $C_{12\text{-}14}$ fatty alcohol | BASF |
| MMA | Monomer | Methyl methacrylate | Arkema |
| 2EHA | Monomer | 2-Ethylhexyl acrylate | Arkema |
| BUA | Monomer | Butyl acrylate | Arkema |
| DAMEMA | Monomer | 2-(Dimethylamino)ethyl methacrylate | Arkema |
| AA | Monomer | Acrylic acid | Arkema |
| TBHP | Peroxide | 70% tert-Butyl hydroperoxide | Aldrich |
| SFS | Reducing agent | Sodium formaldehyde sulfoxylate | Bruggeman |
| $NH_4OH$ | Neutralizing agent | Ammonium hydroxide | Prolabo |
| Acticide MBS | Biocide | Aqueous solution of methylisothiazoline (MIT) and of benzisothiazolinone (BIT) (2.5% MIT/2.5% BIT) | Thor |
| Silquest ® A-187 | Additive | (3-Glycidoxypropyl)trimethoxysilane | Momentive |

II) Examples of Preparation of the Dispersions According to the Invention and Comparative Dispersions The procedure described below describes the synthesis of the dispersion according to example 1. It remains the same for the other dispersions of the other examples described in this patent (except for the modifications indicated for compositions).

Example 1 (According to the Invention)

Equipment Used

A 3 l (internal capacity) glass reactor equipped with a jacket, provided with efficient stirring (vortex), with a three-flow condenser, with control and with regulation of the material temperature. The reactor comprises the number of introduction connections necessary for the separate introduction of various components, and also an introduction dedicated to rendering the assembly inert with nitrogen. The leaktightness is checked before each synthesis. The installation is equipped with a system making it possible to control the flow rates for introduction of the components.

Preparation of the Initial Charge as Vessel Heel 52 g of Rhodafac® RS610 are dissolved in 791 g of demineralized water. The temperature of the vessel heel is brought to 65-68° C.

Preparation of the Pre-Emulsion 1

20 g of Rhodafac® RS610 are dispersed in 85 g of demineralized water with good stirring. The following are added in turn and with good stirring:

250 g of MMA 100 g of BUA 130 g of 2EHA 20 g of AA

The pre-emulsion thus formed is white and stable and will be maintained under gentle stirring.

Preparation of the Pre-Emulsion 2

20 g of Rhodafac® RS610 and 7.5 g of Disponil® A3065 are dispersed in 180 g of demineralized water with good stirring. The following are added in turn and with good stirring:

240 g of MMA 190 g of 2EHA 70 g of DAMEMA

The pre-emulsion thus formed is white and stable and will be maintained under gentle stirring.

Preparation of the Catalyst Solutions 4.3 g of TBHP (70%) are dissolved in 19 g of water.
3 g of SFS are dissolved in 73.4 g of water.

Polymerization Process

1) Seeding

The vessel heel with the initial charge, being temperature stable at 65-68° C., and 7% of the pre-emulsion 1 are introduced for the seeding. Once the temperature has stabilized, 14.8% of the TBHP solution and 14.8% of the SFS solution are added. The exothermicity maximum marks the end of this stage.

2) Polymerization 1

Once the exothermicity maximum is reached, the process is continued with the launch of the separate introductions in 120 min at a temperature maintained between 65° C. and 69° C. of:
93% of the pre-emulsion 1
22.5% of the TBHP solution
22.5% of the SFS solution

3) Neutralization

The pH of the reaction medium is brought to a pH of 7.5-8 by addition of ammonia.

4) Red/Ox Treatment 1

15.1% of the TBHP solution and 15.1% of the SFS solution are added in 60 minutes at 65° C.-69° C.

5) Polymerization 2

Launch of the separate introductions in 120 min at a temperature maintained between 65° C. and 69° C. of:
100% of the pre-emulsion 2
30% of the TBHP solution
30% of the SFS solution

6) Red/Ox Treatment 2

17.6% of the TBHP solution and 17.6% of the SFS solution are added in 60 minutes at 65° C.-69° C.

7) Final Additions

After cooling the reaction medium to 30-35° C., the latex is post-added with a biocide. After stirring for 30 minutes, 7.9 g of Silquest® A-187 are added in 15 minutes and then the reaction medium is left stirring for 40 minutes.
The solids content of the latex is subsequently adjusted with water down to a solids content of 43% and then the product is filtered through a 100 micron cloth.

The final particle size is approximately 100 nm and the measured MFFT is close to 15° C.

Example 2 (Comparative Outside the Invention)

The dispersion of comparative example 2 is obtained in the same way as that of example 1; however, in this example, the Silquest® A-187 is not added.

The physicochemical characteristics of the dispersions prepared (examples 1 and 2) are presented in table 2 below with composition and MFFT, Tg and SC characteristics).

TABLE 2

| | MMA | 2EHA | BUA | DAMEMA | AA | Silquest ® A-187 | Tg | SC | MFFT |
|---|---|---|---|---|---|---|---|---|---|
| Example 1 (according to the invention) | 49% | 32% | 10 | 7% | 2% | 0.8% | 18° C. | 43% | 15° C. |
| Example 2 (comparative) | 49% | 32% | 10 | 7% | 2% | 0 | 18° C. | 43% | 15° C. |

Physicochemical Characterization of the Dispersions a) Solids Content (SC)
The solids content of the aqueous dispersions is measured according to the standard ISO 3251:2019.
b) pH
The pH of the aqueous dispersions is measured according to the standard ISO 976:2013.
c) Size of the Particles
The size of the particles is measured by light diffraction according to the standard ISO 22412:2017, using a Delsa max pro apparatus from Beckman Coulter.
d) Minimum Film Formation Temperature (MFFT) Measured
The MFFT of the aqueous dispersions is measured according to the standard ISO 2115:1996.
e) Glass Transition Temperature (Tg)
The Tg is measured by DSC (Differential Scanning calorimetry) with a gradient of 10° C. per minute after drying the samples at 105° C. for 2 h.

III) Evaluation of the Coatings

Formulations Tested, Compositions and Preparation

The emulsion represents 33% of the formula (calculated on the basis of the dry resin on the dry of the paint which has a solids content of 58.6% by weight). The paint has a pigment volume concentration of 40% (without adjuvant). The composition of the formulation is presented in table 3 below.
The emulsion has a solids content of 43%.

Primer Formulation

TABLE 3

| | Constituents | Weight | Volume | Function |
|---|---|---|---|---|
| 1 | Water | 70.0 | 70.0 | solvent |
| 2 | Acticide MBS | 2.0 | 1.9 | biocide |

TABLE 3-continued

| | Constituents | Weight | Volume | Function |
|---|---|---|---|---|
| 3 | Disperbyk 190 | 13.5 | 12.7 | dispersing agent |
| 4 | Foamaster MO 2134 | 2.0 | 2.2 | antifoaming agent |
| 5 | Tiona 595 | 200.0 | 48.8 | $TiO_2$ |
| 6 | Plastorit Micro | 50.0 | 18.2 | filler |
| 7 | Minex S6 | 70.0 | 26.9 | filler |
| 8 | Minex S4 | 60.0 | 23.1 | filler |
| 9 | Emulsion | 450.0 | 432.2 | acrylic dispersion |
| 10 | Texanol | 9.0 | 9.5 | coalescence agent |
| 11 | Water | 56.0 | 55.5 | solvent |
| 12 | Coapur ™ 2025 | 16.5 | 15.9 | associative PU thickener |
| 13 | Coapur ™ 830 W | 1.0 | 0.9 | associative PU thickener |
| | Total | 1000.0 | 718.9 | |

Procedure for Testing the Blocking of Knots of Wood of a Blocking Primer

The test of the blocking of knots of wood consists in applying, with a brush, to a wood test specimen exhibiting visible knots on its surface, a layer with a coverage of 150 g/m² wet of primer with the composition described above (table 3), followed by two layers of satin acrylic topcoat with a coverage of 150 g/m² wet, exhibiting no performance quality of blocking the blemishes, as described above for the present invention. The wood chosen in this example is pine (*Pinus pinaster*) with visible knot and a moisture content of approximately 10% by weight.

The drying time between each of the three layers is 16 hours under a controlled atmosphere at 23° C. and 50% relative humidity. After the application of the final layer, the test specimen is conditioned for 7 days under a controlled atmosphere at 23° C. and 50% relative humidity.

Subsequently, the test specimen is prepared in order to undergo an accelerated aging of 72 h by exposure in a QUV aging chamber.

The accelerated aging cycle is as follows: 4 h of exposure to a UVA cycle at 60° C., followed by 4 h of exposure to a condensation cycle under 50° C.

After the 72 h of accelerated aging, the test specimen is removed and then dried with a dry rag. The test specimen is conditioned for 24 h under a controlled atmosphere at 23° C. and 50% relative humidity.

The result is expressed by the measurement of the ΔE*, before and after the accelerated aging, of the painted surface above the knot. The ΔE* is measured using a Konica Minolta Spectro CM2600D appliance, D65/10°. A visual assessment of the coloring of the test specimen and of the blistering is given.

Application Results

See table 4 below.

TABLE 4

| | Formula | |
|---|---|---|
| | Paint formula with dispersion example 2 | Paint formula with dispersion example 1 |
| ΔE* | 10 | 5 |
| Observations | Blistering and significant discoloration, see [FIG. 2] | Slight discoloration, paint devoid of blistering, see [FIG. 1] |

The invention claimed is:

1. A wood substrate coated with at least one coating layer, wherein the coating layer comprises a coating composition, wherein the coating composition comprises at least one polymer dispersion, wherein the polymer dispersion is an aqueous polymer dispersion of a polymer comprising, in its structure, monomer units incorporated from a composition of monomers comprising:

a) at least one (meth)acrylic monomer which is a $C_1$-$C_{18}$ alkyl or $C_6$-$C_{18}$ cycloalkyl (meth)acrylic ester, without any ionic group, b) at least one ethylenically unsaturated monomer carrying at least one carboxylic acid group, and c) at least one ethylenically unsaturated monomer carrying a tertiary amine, wherein said polymer additionally comprises grafted silane groups in a form of —Si$(OR_1)_3$ or —Si—$R_2$$(OR_1)_2$ or —Si—$(R_2)_2$$(OR_1)$, with $R_1$, $R_2$ being an identical or different $C_1$ to $C_4$ alkyl, wherein the composition of monomers comprises less than 25% by weight of vinylaromatic monomers, and wherein said grafted silane groups are incorporated by (i-a) preparing an aqueous dispersion comprising monomers (a), (b), (c) and silane graft compound (e) and simultaneously polymerizing monomers (a), (b), and (c) and grafting to their polymerization product silane compound (e) or (i-b) post-treating an aqueous dispersion comprising the polymerization product of monomers (a), (b), and (c) with graft silane compound (e);

wherein the silane compound (e) comprises at least one silane group and at least one functional group capable of reacting, at least in part, with the carboxylic groups of monomer (b) selected from the group consisting of epoxy-, amino-, thiol-, hydroxyl-, and isocyanate groups.

2. The wood substrate as claimed in claim 1, wherein said monomer b) is selected from (meth)acrylic acid, itaconic acid, fumaric acid, maleic acid and crotonic acid.

3. The wood substrate as claimed in claim 1, wherein said monomer c) is selected from: 2-dimethylaminoethyl (meth) acrylate, 2-diethylaminoethyl (meth)acrylate, N-(3-(N,N-di-methylamino) propyl) (meth) acrylamide, 3-dimethylamino-propyl (meth)acrylate, 3-diethylaminopropyl (meth) acrylate, 4-(N,N-dimethylamino) styrene, 4-(N,N-diethylamino) styrene, 4-vinylpyridine, 2-dimethylaminoethyl vinyl ether, 2-diethylaminoethyl vinyl ether, 3-dimethylaminopropyl vinyl ether, 3-diethyl-aminopropyl vinyl ether, 4-dimethylaminobutyl vinyl ether and 6-dimethylaminohexyl vinyl ether.

4. The wood substrate as claimed in claim 1, wherein said monomer a) is a $C_1$-$C_{18}$ alkyl (meth)acrylate chosen from methyl (meth)acrylate, ethyl (meth)acrylate, propyl (meth) acrylate, butyl (meth)acrylate, 2-ethylhexyl (meth)acrylate, isooctyl and n-octyl (meth)acrylate, nonyl (meth)acrylate, decyl (meth)acrylate, lauryl (meth)acrylate and stearyl (meth)acrylate, or a $C_6$-$C_{18}$ cycloalkyl (meth)acrylate cho-sen from: cyclohexyl (meth)acrylate with cyclohexyl sub-stituted or unsubstituted by a $C_1$-$C_4$ or $C_1$-$C_2$ alkyl, isobor-nyl (meth)acrylate, norbornyl (meth)acrylate and dicyclopentadienyl (meth)acrylate.

5. The wood substrate as claimed in claim 1, wherein the composition of monomers comprises:

from 50% to 98% of said monomer a), from 0.5% to 10% of said monomer b), from 0.5% to 20% of said monomer c), the % values being % values by weight, with respect to the weight of the composition of monomers.

6. The wood substrate as claimed in claim 1, wherein said monomer a) is a mixture of a monomer a1), which is at least one $C_1$-$C_2$ alkyl (meth)acrylate, and a2), which is at least one $C_4$-$C_{18}$ alkyl (meth)acrylate.

7. The wood substrate as claimed in claim 6, wherein said mixture a) comprises, as monomer a1), methyl or ethyl (meth)acrylate and, as monomer a2), butyl or 2-ethylhexyl or lauryl (meth)acrylate.

8. The wood substrate as claimed in claim 1, wherein said polymer has a Tg, determined by DSC, with a heating rate of 10° C./min, in two passes, ranging from −20 to 60° C.

9. The wood substrate as claimed in claim 1, wherein the aqueous polymer dispersion has a minimum film formation temperature (MFFT) according to the standard ISO 2115: 1996 method which ranges from 0 to 60° C.

10. The wood substrate as claimed in claim 1, wherein said silane compound e) in route (ii) is selected from: epoxysilanes, aminosilanes, thiosilanes and hydroxysilanes.

11. The wood substrate as claimed in claimed 1 wherein a comonomer (d) is included in the polymerization mixture of route (i-a) or is incorporated into the polymerization product of route (i-b); the comonomer (d) comprising, in addition to ethylenic unsaturation, at least one of the silane groups —$Si(OR_1)_3$, —$Si(R_2(OR_1)_2$, or —$Si(R_2)_2 (OR_1)$.

12. The wood substrate as claimed in claim 11, wherein said at least one ethylenically unsaturated comonomer d) in route (i) is selected from: (meth)acrylic, vinyl and allyl monomers carrying at least one silane group.

13. The wood substrate as claimed in claim 1, wherein said grafted silane groups are present with a content by weight of said comonomer d) and/or of said compound e) ranging from 0.01% to 5% with respect to the dry weight of said polymer.

14. The wood substrate as claimed in claim 1, wherein said aqueous polymer dispersion represents from 10% to 60% by dry weight of solids, with respect to the total weight of the solids of said coating composition.

15. The wood substrate as claimed in claim 1, wherein the coating composition is an aqueous paint, varnish or stain composition for the protection of wood.

16. The wood substrate as claimed in claim 1, wherein the coating composition is a primer and/or topcoat which is resistant to blistering and to the migration of tannins to a wood surface.

17. The wood substrate as claimed in claim 1, wherein the coating composition is crosslinkable with or without the addition of a crosslinking agent.

18. The wood substrate as claimed in claim 1, wherein the coating layer is a paint layer, a primer layer, a topcoat layer, a varnish layer, or a stain layer.

19. The wood substrate as claimed in claim 1, wherein said wood is chosen from: pine, fir, beech, oak, cedar, spruce, poplar, sweet chestnut, cherry, and walnut.

\* \* \* \* \*